(12) United States Patent
Joseph (10) Patent No.: US 9,007,214 B2
(45) Date of Patent: Apr. 14, 2015

(54) SECURITY TAG WITH DISPLAY AND PRICE CHANGING SYSTEM

(76) Inventor: Joseph Joseph, Jamaica, NY (US)

( * ) Notice: Subject to any disclaimer, the term of this patent is extended or adjusted under 35 U.S.C. 154(b) by 0 days.

(21) Appl. No.: 13/507,748

(22) Filed: Jul. 24, 2012

(65) Prior Publication Data

US 2013/0194097 A1 Aug. 1, 2013

Related U.S. Application Data

(63) Continuation-in-part of application No. 13/200,778, filed on Sep. 30, 2011, now Pat. No. 8,669,873.

(51) Int. Cl.
*G08B 13/14* (2006.01)
*G08B 13/24* (2006.01)
*G06K 19/07* (2006.01)

(52) U.S. Cl.
CPC .......... *G08B 13/246* (2013.01); *G08B 13/2417* (2013.01); *G08B 13/2462* (2013.01); *G08B 13/2482* (2013.01); *G06K 19/07* (2013.01); *G08B 13/2434* (2013.01)

(58) Field of Classification Search
USPC .................... 340/572.1–572.9, 10.1
See application file for complete search history.

(56) References Cited

U.S. PATENT DOCUMENTS

| | | | | |
|---|---|---|---|---|
| 2005/0197973 A1* | 9/2005 | Endo | | 705/400 |
| 2007/0273518 A1* | 11/2007 | Lupoli et al. | | 340/572.1 |
| 2008/0129037 A1* | 6/2008 | Roth et al. | | 283/85 |
| 2009/0309736 A1* | 12/2009 | Heurtier | | 340/572.8 |
| 2010/0065632 A1* | 3/2010 | Babcock et al. | | 235/385 |

* cited by examiner

*Primary Examiner* — Phung Nguyen
(74) *Attorney, Agent, or Firm* — Stephen E. Feldman; Feldman Law Group, P.C.

(57) ABSTRACT

A system for merchandise tagging is described that includes a plurality of programmable RFID security tags, a controller, and a plurality of RFID readers. The attributes associated with the RFID security tags are assigned and changed remotely by an authorized request from the system. Any unauthenticated request to access or change the data associated with the RFID is ignored by the system.

31 Claims, 10 Drawing Sheets

SECURITY TAG WITH DISPLAY AND PRICE CHANGING SYSTEM

CROSS-REFERENCE TO RELATED APPLICATIONS

This application is a continuation in part of U.S. patent application Ser. No. 13/200,778, filed on Sep. 30, 2011 entitled "INVENTORY AND ANTI-THEFT ALARM SYSTEM," hereby incorporated by reference.

BACKGROUND

Security and inventory management are sensitive issues in retail management of small as well as big stores that offer a range of products to their customers. Such stores generally have global and local strategies of security and anti-theft. The stores generally fix the prices of their products with pre-printed labels. These prices, however, may quickly change in reaction to variable factors such as (1) change in supply and demand, (2) Holiday shopping season sales or (3) any other quick response dependent events. When these prices change, an employee must physically go to each item and change the price. This process is time consuming and has many chances for human error e.g., mismarking an item with a wrong price.

Various computer based systems for security merchandise management have been used in the past. These systems generally include a detection mechanism that identifies the movement of merchandise stored at predefined locations in the stores. Other inventory management and security systems include tags on products that transmit signals to a server using radio signals for security purposes. These systems proved to be useful to monitor the merchandise in the stores, however, the tags are very delicate and have very short battery lifespan.

SUMMARY

An inventory management and security system is needed for tagging merchandise displayed in a store. The system may include a plurality of programmable RFID tags where various attributes associated with the RFID tags can be changed remotely. The security tags may also include an internal "on-board" display that may display a price of the merchandise and any other attributes that may be useful for a consumer or employee to view. These attributes may be changed from a remote location in the store via the system with a verification module that rejects unauthorized requests to change the information on the RFID tag.

In other words, an RFID based merchandise management and security system incorporates a security tag that responds to a predetermined secure wireless request from an authorized user. The information in the security tag may be changeable after receiving a valid wireless request from the system. For example, the price of the merchandise may be displayed on the respective security tag and this price is changeable by an authorized user from the central controller.

In one embodiment, the merchandise management and security tag comprises a security sensor, an electronic circuit, and a display. The security sensor sends and receives wireless signals while the electronic circuit coordinates the wireless signals. The wireless signals may be associated with data, e.g., a price of an item.

The on-board electronic circuit may also include a processor and memory. The processor and memory stores a unique identification code of the security tag in the memory and stores, displays, and edits codes associated with the tag. The display shows the price of the item. The electronic circuit may be an RFID circuit that communicates with external devices, e.g., a controlling unit and/or an RFID reader. The RFID reader is capable of reading the security sensor through radio frequency signals. The security tag may also include a power storage unit that may be connected to a solar panel that provides energy to the electronic circuit and makes it readable to an RFID reader.

In another embodiment, a system for merchandise management using security tags is described. The system includes a system controller, a plurality of RFID readers, and a plurality of RFID tags. The controller includes a coder, a decoder, a RAM, a server, a data base, and a receiver(s). The RFID readers communicate with controller and RFID tags.

Each of the security tags includes a unique identification code that is stored in the memory of the RFID chip located in the merchandise management security RFID Tag. The reader of the system has the capability to read the code and authorize the tag or any changes that are made. The database stores information related to each of the readers and each of the unique RFID capable security tags. The database is advantageously used to generate reports as well as track the sales or inventory when required by the system.

Initially, the merchandise in the shop is associated with a security tag in accordance with the present invention. The attributes of the merchandise such as price, source, date of purchase, etc, are assigned to the tag and automatically updated in the database. The prices associated with the tags are remotely changeable by the system. The changed attributes are automatically updated in the database. This feature is beneficial in many ways. For example, when a customer brings an item to a payment counter, the reader reads the identification of the tag and displays correct price to the merchandise, even if the price is recently changed. This eliminates price look-up for items and other processes such as supervisory authorizations or "over-rides" that may slow down the checkout process for both the customer and the retailer.

In another embodiment, the disclosed technology is a computer-implemented method for coordinating Radio Frequency Identification (RFID) tags within a management system. The method may scan for an RFID tag with a particular unique identification number. The management system creates these identification numbers for each RFID tag. Once located, the system may transmit attributes to the RFID tag. The attributes may include but is not limited to a price attribute, type of merchandise, a supplier name, a date of delivery and a product name. These attributes are stored within a memory associated with the RFID tag. The price attribute is then displayed on a display of the RFID tag such as an LCD screen and may be edited as needed. The RFID tag also (1) has a security feature associated with each RFID tag that may be activated by the system as needed. (2) may have a solar power source and (3) may be used to track sales and inventory.

In another embodiment, the disclosed technology is a system for coordinating RFID tags within a management system. The system may comprise one or more processors and one or more computer-readable storage mediums containing instructions configured to cause the one or more processors to perform operations. The system may scan for an RFID tag with a particular identification number. The management system creates these unique identification numbers for each unique RFID tag. Once located, the system may transmit attributes to the RFID tag. The attributes may include a price attribute, type of merchandise, a supplier name, a date of delivery and a product name. These attributes are then stored within a memory associated with the RFID tag. The price attribute is displayed on a display of the RFID tag and may be edited as needed. The RFID tag also has a security feature associated with each RFID tag that may be activated by the system wherein an alarm or notice may be triggered in the event an RFID tag moves illogically. The RFID tag also may have a solar power source and may be used to track sales and inventory.

In another embodiment, the disclosed technology is a system for controlling and displaying prices of merchandise on security tags, e.g., a programmable RFID device. The system may comprise a system controller for controlling attributes associated with merchandise, a plurality of security tags, the security tag including a price display adapted to show the price of the respective merchandise and a plurality of readers for reading and remotely changing the price of the merchandise associated with the respective tag. The price displayed on the tag is changeable from the controller by an authorized user and any unauthenticated request to access the data base of the controller is ignored.

The controller may include a RAM, a coder, a decoder, a database and a radio frequency signal receiver and each of the security tags may include sensor, electronic circuit, a RAM, a ROM, and power storage unit.

DETAILED DESCRIPTION

FIGS. 1A-C and 2 illustrate a RFID tag system for the present invention as it is applied to an item of merchandise. The present invention provides for a system that provides an inventory and/or anti-theft alarm tag or label utilizing RFID technology. As each item is presented as inventory in the system it can be tagged or labeled with RFID technology and placed in a master database. If the item is selected for purchase by a customer then it is scanned at point of sale and the RFID tag or label is deactivated and can be used again for another item of merchandise.

The master database 15 may also be interrogated by the system. The master database 15 (FIG. 2) contains pertinent information which is systematically matched to or related by information to the RFID tag 5. The master database 15 may contain, by way of non-limiting illustrative example, information such as SKU, color, style, size, cost, retail price, quantities, etc. of each item of merchandise. As noted previously each item of merchandise will have its own unique RFID tag 5. The RFID tag 5 information includes a unique serial number which can include, but is not limited to, product keys such as for a class or department code to identify the associated item the tag 5. The master database 15 can index through the unique RFID items and their corresponding SKUs and/or other relevant information providing a valuable tool for identifying and locating the item being sought. In addition this information permits the present invention to effectively track the sequence number for each lock/unlock/cut cable/commissioning/scan activity as described below in detail.

Figure 1A:
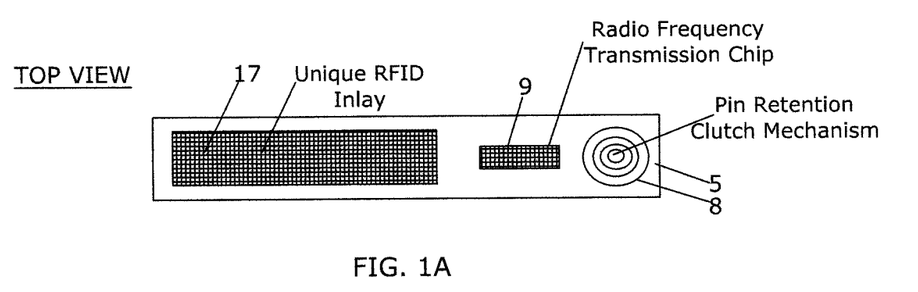
FIG. 1A is a top view or the RFID Tag of the present invention.
Figure 1B:
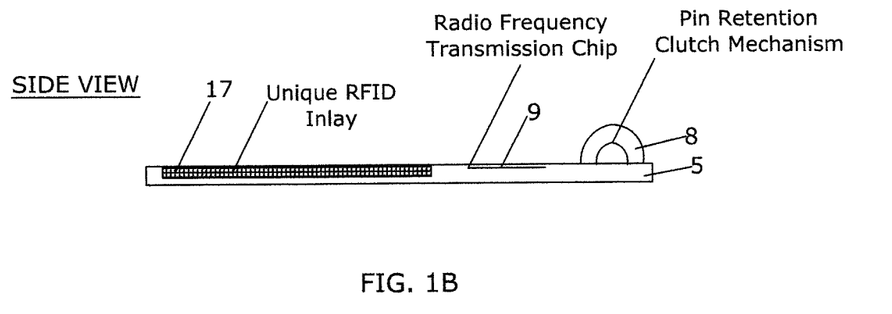
FIG. 1B is a side view of the RFID Tag of the present invention.
Figure 1C:
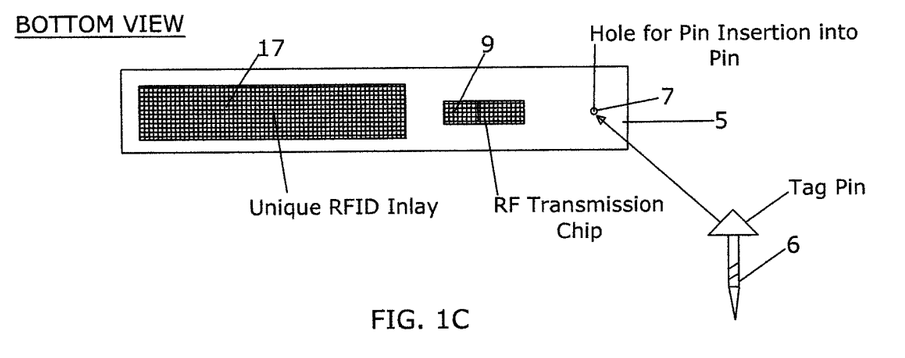
FIG. 1C is a bottom view of the RFID Tag of the present invention.

FIGS. 1A-C illustrate how the RFID tag 5 may be attached to an item of merchandise such as but not limited to a garment item or a pair of shoes. In a preferred embodiment of the present invention, as shown in FIG. 1A-C, an RFID tag 5 is equipped with a locking pin 6 and or a cable/clutch assembly 8 and an on-board RF transmitter 9 and circuit or "counting/cut" chip incorporated in the RFID inlay 17. This "counting/cut" chip keeps track of a sequential event sequence number that increases by "1" every time the locking pin 6 is locked or unlocked or in the event the cable is cut. Further, every time the event sequence number changes, caused by a locking or unlocking event or a cut cable, the on-board counting/cut chip would transmit the new sequence number to the RFID inlay 17 in the same tag 5 and/or to a receiver in the location.

The insertion of the pin 6 or cable into the clutch mechanism in effect closes the loop in the circuit. If the pin is removed, or the cable is cut, the circuit is broken and the breaking of the circuit triggers a unique sequence event to the counting/cut chip.

The software used by the invention is proprietary in design and as such we are providing an overview. The insertion of a pin 6 or lanyard into the clutch mechanism causes a transmission of a closed status for that particular RFID Tag 5 and its on-board circuitry 17. This information as well as date, time, operator, etc are stored in the memory of the RF chip on the tag as well as in the master database and as such the "counting/closing" begins. Upon the pin being released from the clutch and/or the cable being cut, the circuit is broken triggering an "open" transaction that is captured by the database and stored. The software tracks status of the tag and updates status, for example, if: the tag is open and the circuit is open, the tag is closed by operator onto the garment, the tag is closed and circuit is closed, the data of the tag is passed electronically to a database and/or when the tag closes a Status Reported to Master Database and a Unique Sequence Event Recorded.

The tag 5 has an RFID inlay 17 and a pin 6 that is inserted into an opening 7 and locked in place by a clutch mechanism 8 to affix the tag 5 to the item of merchandise as shown in FIGS. 1A-C. The pin 5 and clutch mechanism 8 can be unlocked and relocked at point of sale. When the pin 5 is inserted into the clutch 8 at the time of RFID commissioning it completes a circuit for notifying the on-board smart or counting/cut chip that the tag is locked and records the time and date of each subsequent lock/unlock event. It also records a sequence of these events. This information is provided to the master database 15 using the unique RFID encoded item number. The encoded item number which can be encoded in the inlay 17 that the item is locked and in inventory as well as the lock/unlock sequence number.

The process of "commissioning" is the process wherein the SKU, item number or UPC number of the item is "married" with the unique RFID number contained in the tag. This is accomplished by first obtaining a standard BAR code read of the item's SKU and then associating that number with the unique RFID number in the SQL master database. Alternatively, if the SKU number is already known, the software can marry that number with the unique RFID number. This can be done on a conveyor system or one-by-one using a standard BAR code scanner and an RFID reader/writer. The associated pairing of the BAR code SKU and RFID tag number can be accessed by using either number as the index key within the system.

Figure 3:
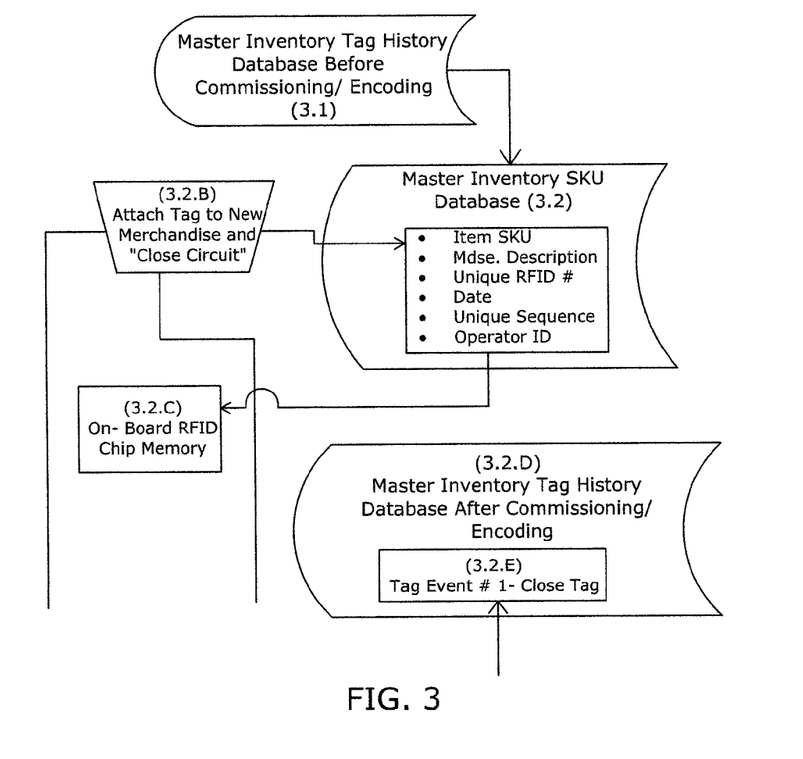
FIG. 3 is illustration of the present invention.

FIG. 3 shows a block diagram for the system. The Master Inventory Tag History Database before encoding of a new tag has no information on a tag until it is encoded (3.1.). The Master Inventory SKU Database contains information on every item that has been encoded (3.2) including, but not limited to: Item SKU, Merchandise Description, Unique RFID Tag Number, Date of Activity, Unique Sequence Number, and Operator ID (3.2.A). The RFID tag is attached to the new merchandise and "Close Circuit" status is sent to the Master Inventory Tag History Database (3.2.B). FIG. 3.2.D shows "Tag event #1-Closing of Tag" evidenced by 3.2.E and the association of that tag information is loaded to the Master Inventory SKU Database 3.2. FIG. 3.2.C shows the on-board memory chip of the RFID tag is now in-synch with the Master Inventory SKU Database. FIG. 3.2.D shows that after encoding, the Master Inventory Tag History Database now contains the unique event of the tag; the closing of the tag 3.2.E

The counting/cut chip and the RFID inlay that share the same tag 5 are "partnered" with each other creating a systemic association linking the counting/cut chip ID with the unique RFID inlay's number for that particular tag 5. This is done so that they only interact with each other. In this way writing of data or reading of data relative to lock/unlock or cut cable transactions at the tag level can only happen between the corresponding, partnered chip and RFID inlay for that particular tag 5.

The counting/cut chip includes: an onboard memory; either an onboard power supply preferably either a battery or solar cell for powering a circuit. The counting/cut chip counts locking/unlocking or cut cable sequences; transmits information directly to the master database 15, a receiver or a handheld if the circuit is broken via the cable being cut or the pin being locked or unlocked. It can also transmit information directly to the memory of its paired RFID inlay if the circuit is broken via the cable being cut or the pin being locked or unlocked.

Figure 4:
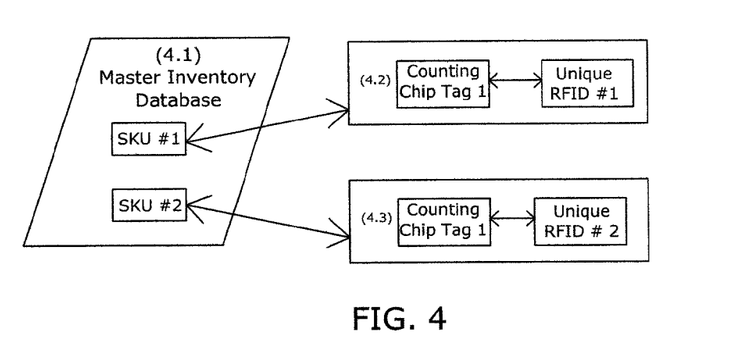
FIG. 4 is illustration of a master inventory database of the present invention.

As shown in FIG. 4, the Master Inventory Database contains information on all SKUs and UPCs and has a direct 1:1 unique relationship with each article of merchandise identified with a unique RFID tag illustrated in 4.2 and 4.3. Each RFID tag contains a unique RFID and unique counting chip that only communicates with each other and has a unique 1:1 relationship with a particular item of clothing. The association of that tag and the item of clothing is exclusive. This means that no other tag can be associated that article of clothing in the database (4.1).

The tag 5 can be one of the following: (a) the tag incorporates a separate counting/cut chip for writing to the enclosed RFID chip and/or (b) the tag is the RFID hybrid wherein the change in status of the tag (locked or unlocked) is written directly into the memory portion of the embedded RFID chip thus eliminating the need of an additional counting/cut chip. This encoding or commissioning is accomplished by taking user defined data and electronically writing it into the embedded memory of the RFID chip, using either an RFID antenna or other devices such as but not limited to an array of antennas, a handheld RFID scanner device, a RFID capable printer or any other RFID writeable device c. the tag is a radio frequency/RF chip 9 for transmitting data directly to a continuously scanning receiver for providing information to the inventory management system. This is done when the chip is energized by a receiver or changes in status.

Figure 2:
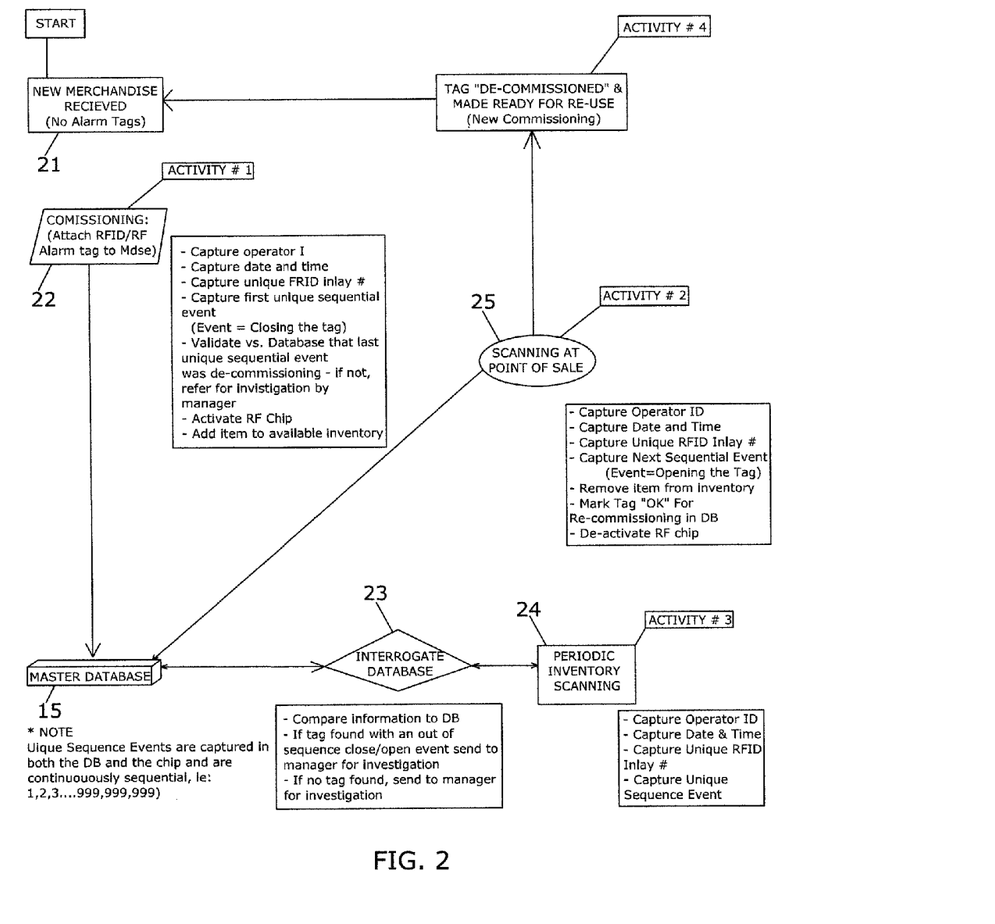
FIG. 2 is a flow chart illustrating the system of the present invention.

The RFID tag 5 communicates via an RF transmitter 9 to a master database 15 (See FIG. 2). The master date base 15 stores and can compare the information from the RFID tag 5 with the history of that particular RFID tag 5 to check the number of times the tag 5 has been locked and unlocked. It also compares the data on the tag 5 with the data in the master database 15.

Figure 5:
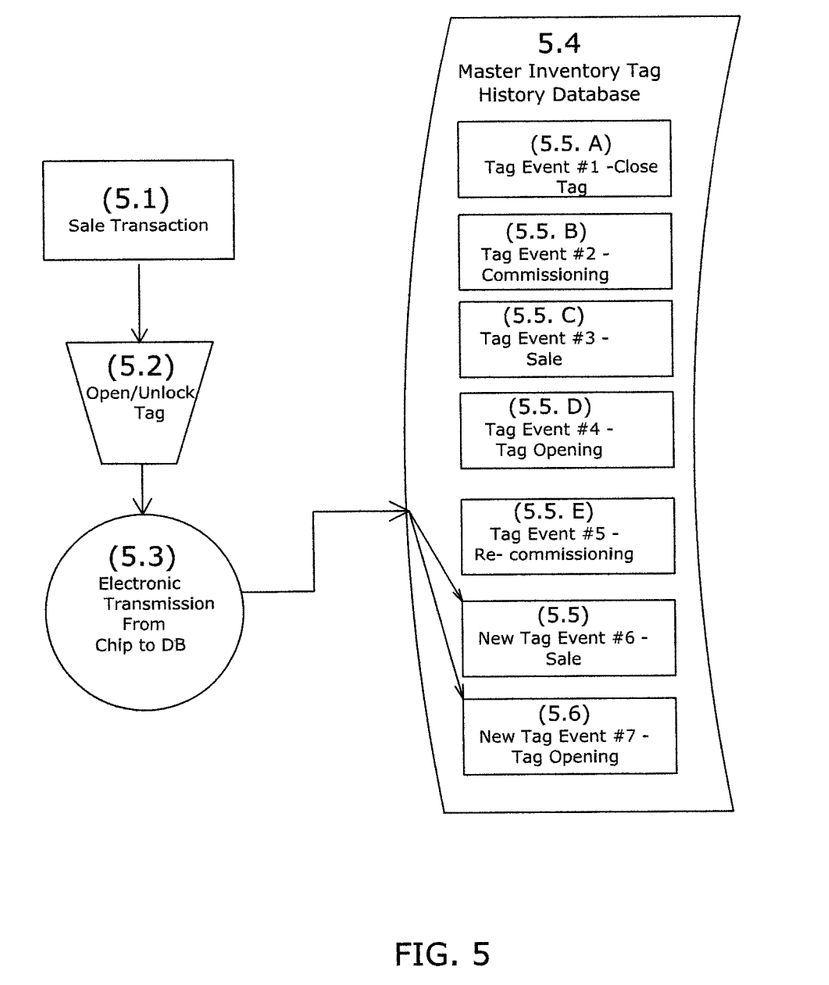
FIG. 5 is illustration of a master inventory tag history database of the present invention.

As shown in FIG. 5, a sale transaction (5.1) allows the operator to unlock the RFID enabled tag (5.2) which creates an electronic transmission (5.3) to the Master Inventory Tag History Database (5.4) that updates the history for that tag with the event of the sale (5.5) and the opening of the tag (5.6) that are added to the existing sequences of past unique events for this tag: For examples, Tag Event #1—the first closing of the tag, Tag Event #2—the commissioning of the tag, Tag Event #3—the sale of the merchandise associated with the tag, Tag Event #4—the opening of a tag after the sale, Tag Event #5—the re-commissioning of the tag on a new piece of merchandise.

Each time an item of merchandise is sold the tag 5 is retired for that item and then the tag 5 is recommissioned for a new item of merchandise. In this way the tag 5 is opened to remove it from the sold item and closed for the new item which the tag is now affixed to so that the master data base 15 has a history of this removal and reuse (replacement) for merchandise items in association with that particular tag 5. This POS— point of sale—transaction, accomplished by RFID scan, systematically transmits this data and information to the master database 15. As seen in FIGS. 1A, 1B and 1C each RFID tag 5 has its own unique RFID inlay 7 and either a counting/cut chip or else the change in status of the tag 5 (e.g. locked or unlocked) is written directly into the memory of the embedded RFID chip and no additional counting/cut chip is required.

Figure 6:
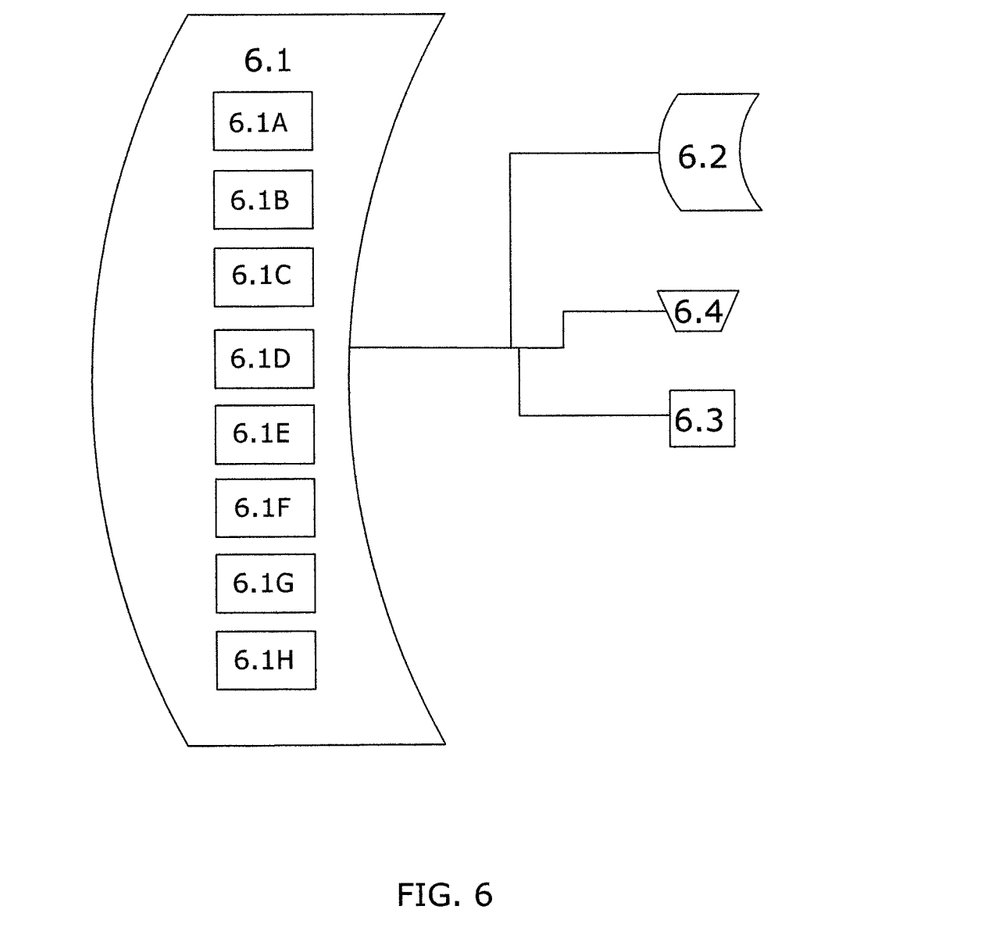
FIG. 6 is illustration of a master inventory tag history database of the present invention.

In the example, prior to a re-commissioning event, the Master Inventory Tag History Database (6.1) contains 7 events relative to a specific RFID tag: Tag Event #1: initial close of the tag, Tag Event #2: initial commissioning of the tag to a piece of merchandise, Tag Event #3: a sale transaction, Tag Event #4: The opening of the tag after the sale to remove from the merchandise, Tag Event #5: The re-commissioning of the tag to a new piece of merchandise, Tag Event #6: The subsequent sale of that merchandise and Tag Event #7: The opening of the tag after the sale.

This information is maintained in the Master Inventory Tag History Database (6.1) as well as the Master Inventory SKU database (6.2) as well as in the resident memory of the RFID tag (6.3). In the example, when the tag is attached to a new piece of merchandise, (6.4) the Master Inventory Tag History Database (6.1) and the Master Inventory SKU database (6.2) as well as in the resident memory of the RFID tag (6.3) are updated with a new unique event (6.1.H) that represents the tag closing and the re-commissioning of that tag onto a new piece of merchandise.

As seen in FIG. 2 the system of the present invention operates as follows: The system 20 receives a new item of merchandise (step 21). The RFID Tag 5 is attached or affixed to this merchandise (step 22). During this step the tag is commissioned (meaning that it is attached or affixed as described in FIGS. 1A-C and it is paired with the RFID number and SKU as well as an operator ID is captured by the system). The date and time is recorded for that merchandise item when the tag is affixed. The RF inlay is recorded by a systemic transaction which updates the master database 15 such as, by way of non-limiting example, a scan of the RFID chip by an RFID reader scan; the first sequential event is recorded—e.g. the locking of the tag 5 on this item of merchandise; a validation is performed by the master database 15: that the last unique event was a decommissioning of the tag (and if not it is referred to the manager for investigation). The chip is then activated and the item is added to the inventory in the master database 15 marking the item as commissioned. If a POS sales transaction associated with the unique RFID chip makes logical equable sense in terms of the locking/unlocking/cut data then no alert is sent to a store manager for investigation. One such logical sequential sequence would be a prior commissioning event, followed by a sales transaction event, followed by a recommissioning event, tied to a new item of merchandise. If there was a non logical sequence, then the item would be referred to the manager to investigate. The physical chip may or may not remain active at all times and available for scanning. The new item is added to the inventory in the master database 15 and is available in inventory.

Figure 7:
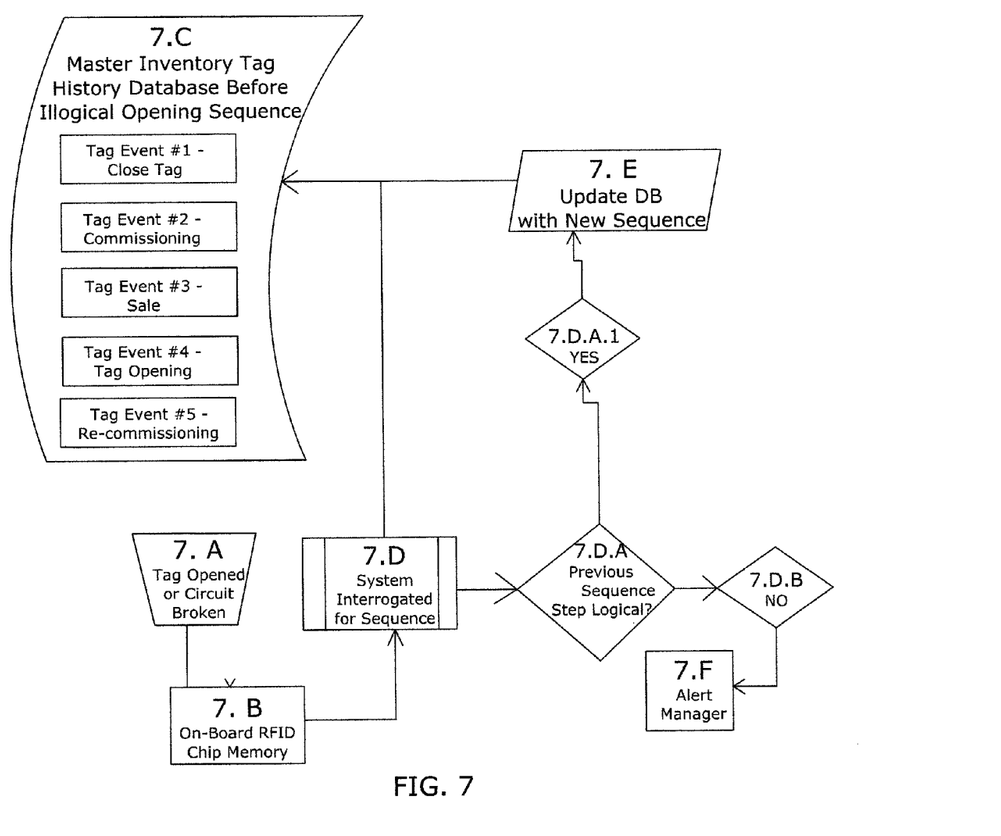
FIG. 7 is a flow chart illustrating an embodiment of the present invention.

This illustrates the sequence of events when a tag is opened, or the circuit is broken on a tag. When the system recognizes that a tag is open, (7.A), the on-board RFID chip (7.B) captures the event and reports that back to the Master Inventory Tag History Database (7.C) where the logical sequence of the event is checked versus prior events (7.D), If the sequence is logical (7.D.A) & (7.D.A.1) then the Master Inventory Tag History Database (7.C) is updated with the next sequence event (7.E). If the event is not logical (7.D.A) & (7.D.B), an alert is sent to the Manager (7.F) for further interrogation and review.

The data base 15 is systematically interrogated (step 23) and compares information from the tag 5 for the new merchandise item 21 with the master database 15. If the tag is determined to be an out of sequence event e.g. the number of opens and closes do not make logical sequential sense, then the item is flagged within the database and the item will require a further security investigation. This further investigation status for the item is displayed in the master database 15 and can be sent as a report, an email message or an automated cell phone call or text message to the manager to investigate the status of this item. Also if no tag is found a signal is sent to the manager to investigate by the same aforementioned means: The system is capable of periodic scanning as defined by the user using antenna arrays or hand held RFID scanners or any other suitable devices.

Software for inventory tracking is resident on the RFID handheld, computer, or other device used for inventory. Each display location has a unique RFID location. In the master database, items of inventory are associated 1:1 to that display location. A daily or ad-hoc download of those relationships are loaded into the handheld reader and or other RFID reading device. The scanning operation requires the operator to scan the RFID location tag and then "search" for each of the associated items of inventory. Software within the RFID reader provides either an audio or visual display of items expected to be in that location or as the scan progresses and items are identified, they are dropped off the list viewable on the screen. When all items have been found, the operator is advised as such. Items not found are referred to a manager for investigation.

Figure 8:
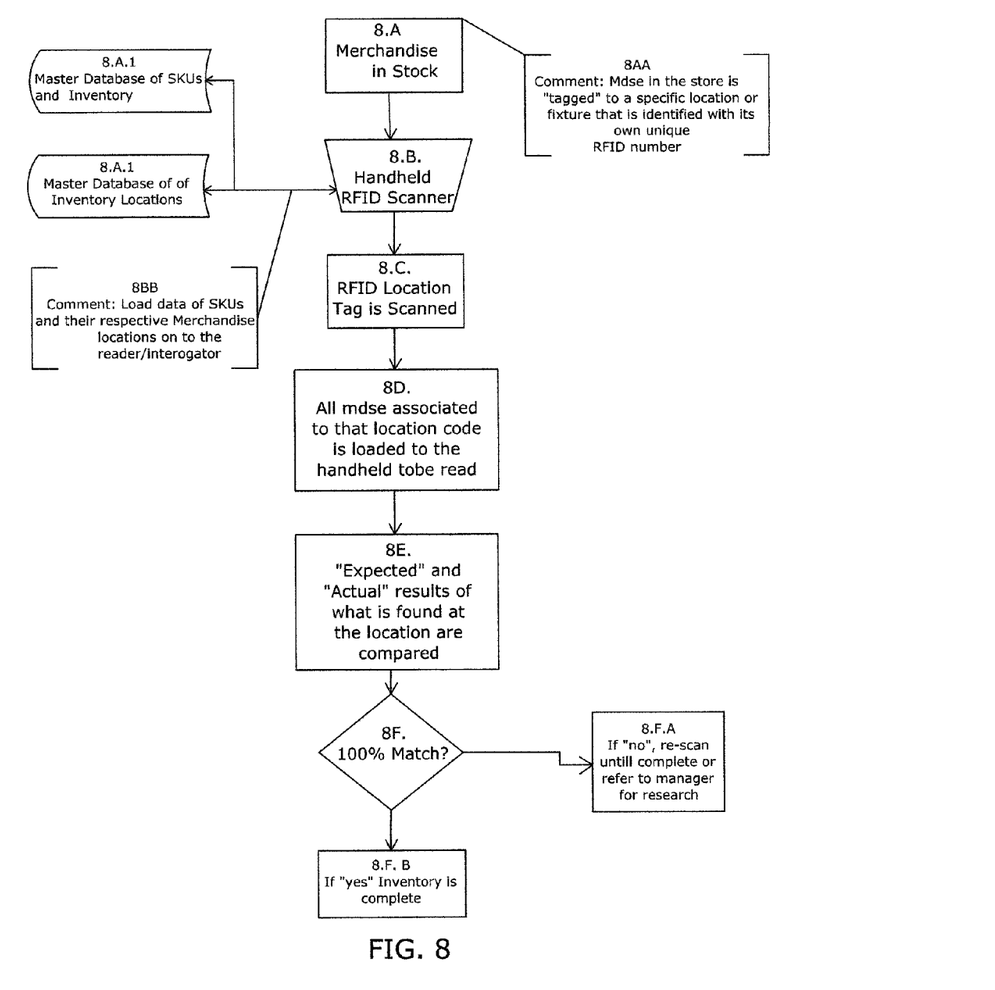
FIG. 8 is a flow chart illustrating an embodiment of the present invention.

To take inventory of merchandise stock (8.A), subsets of the inventory Master Database of SKUs & Inventory stock (8.A.1) and the Master Database of Inventory Locations (8.A.2) are loaded onto a Handheld RFID Scanner, Computer with Antenna array, etc. (8.B). A location is selected from the Location database and the scanner reads the location code (8AA) for that location (8.C). The merchandise associated with that location code is loaded to the mobile device to be read (8.D) and reading begins (8.E) and compares "expected" results with "actual" results found. If there is a 100% match (8.F), inventory is complete (8.F.B). If there is not a 100% match in step (8.F), the differences between "actual" and "expected" results (8.F.A) are flagged or sent to the manager for research.

(Step 24). Such periodic scanning could be continuous and ongoing, include daily inventory, weekly inventory, monthly inventory, semi-annual inventory or an annual inventory period. This periodic scanning will capture all the user defined fields on the master database 15 and in the RFID chip as is required to complete all scanning that is required. At a point of sale transaction an RFID scan captures and updates the master database 15 with the user defined unique employee operator ID of the employee performing the transaction, the date and time of the transaction, the unique RFID inlay number of the item of merchandise associated with that transaction. The next sequential event e.g. is the unlock sequence number.

The captured transaction also removes the tag 5 from inventory in the master database 15 and identifies the tag 5 in the master database 15 as being available for recommissioning. This is accomplished by updating the individual record for that RFID tag 5 as being "sold" and available for recommissioning or reuse, and thus permitting the unique number of the RFID tag 5 to become associated with another item of merchandise in the master database 15 (step 21). Thus the present invention provides for an inventory and antitheft alarm tag utilizing RFID technology providing for either real time or time of scan inventory and theft control while monitoring the time and date of each locking/unlocking event and the sequence of these events.

Figure 9:
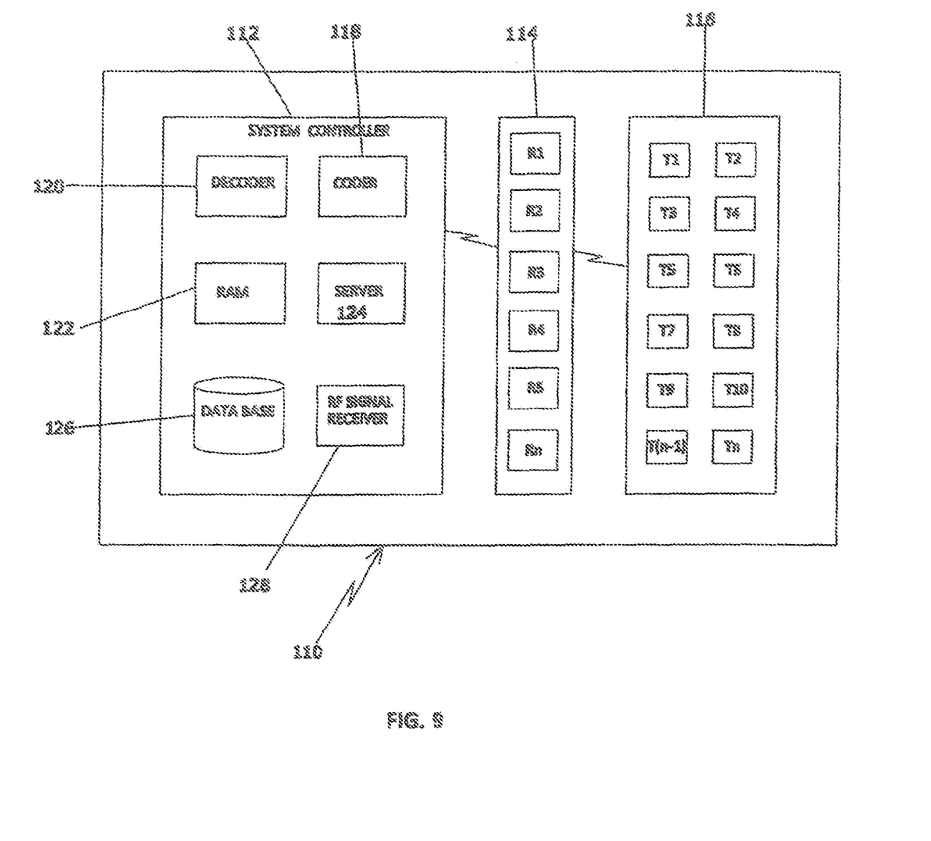
FIG. 9 shows a security tag with RFID capability merchandise management system in accordance with a preferred embodiment of the present invention.

In another embodiment, referring to FIG. 9, a security tag may be part of an RFID device based merchandise management system 110. The system 110 includes a system controller 112, a plurality of RFID readers 114, and a plurality of RFID security tags 116. Controller 112 includes a coder 118, a decoder 120, a RAM 122, a server 124, a data base 126, and a receiver 128. The system 110 includes a number of RFID readers 114 that communicate with controller 112 and RFID security tags 116. Each of the RFID readers 114 communicates with the system controller 112 and the RFID security tags 116. The RFID system may be connected through a network to the controller with internet or intranet that is either wireless or a wired net.

The coder 118 and decoder 120 have the ability to create a code for the RFID security tag 16 and to decode signals received from the RFID security tags 116 respectively. The coder 118 creates an identification number or pin for each of the RFID security tags 116. These identification pins are stored in the RFID tags 116 through the reader. The RAM 122 coordinates with the server 124, coder 118, decoder 120, and database 126 to temporarily store information received in the system 110.

The server 124 is a computing system that contains a computer program that coordinates the system management. The database 126 stores information related to each of the readers 114 and each of the RFID security tags 116. The database 126 provides required information to generate reports by the system 110.

Figure 10:
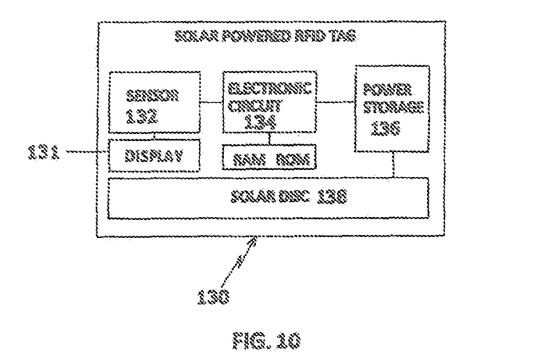
FIG. 10 shows a security tag with RFID tag of the merchandise management system of FIG. 9.

Now referring to FIG. 10, the RFID security tag 130 in accordance with the present invention includes a display 131, a sensor 132, a circuit 134, power storage 136, and a solar panel 138. The display 131 is preferably an electronic display that shows the price of the item associated with security tag 130. The sensor 132 sends and receives wireless signals to controller 112 (FIG. 9). The circuit 134 stores the identification code of the tag and coordinates with the signals received from the controller 112 (FIG. 9). The circuit 134 stores, displays, and edits the code associated with the tag.

The tag may include a solar panel 138 that provides energy to the circuit 134. The tag may have an antenna to transmit and receive wireless signals. The RFID circuit communicates with any external device, such as, a controlling unit, an RFID reader, that can read the sensor through radio frequency signals. The solar powered RFID security tag 130 in accordance with the present invention is preferably used to identify a remotely located object, such as, any merchandise through wireless transmission of signals.

The RFID reader 114 (FIG. 9) reads an identification code associated with the solar powered RFID security tag 130 that is communicated to the controller 112 (FIG. 9). Reader 114 is a device that includes sensors, power storage, digital display, a processor and memory chips. Reader 114, through the sensors identifies one or more security tags 116 in close proximity with reader 114. Reader 114 has ability to send and receive signals to controller 112 and security tags 116. The display of reader 114 is a screen that displays details of tags and controller 114. The controller 112 (FIG. 9) has a database 126 (FIG. 9) that includes data which includes the information of the merchandise associated with the respective RFID security tag. Similarly the data base 126 (FIG. 9) includes other attributes of the merchandise such as price, date of purchase, name of supplier, date of delivery, customer information etc.

In use, the security tag's information is stored electronically in a non-volatile memory. If a product is bought near the exit of a store, an RFID reader transmits an encoded radio signal to interrogate the tag via a small RF transmitter/receiver. Once the tag receives the message, the tag responds with its identification information. This may be a unique tag serial number, or may be product-related information such as a stock number, lot or batch number, production date, or other specific information. If the product is brought within a certain distance from the exit, an alarm will sound on the RFID reader.

Figure 11:
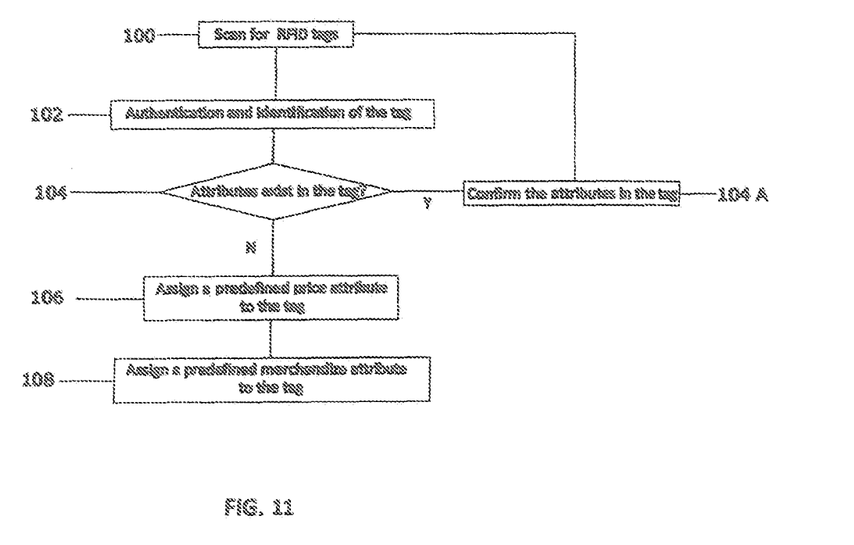
FIG. 11 is flow chart that shows steps involved in a process for assigning merchandise to RFID security tags in accordance with the present invention.

As shown in FIG. 11, steps involved in the process of assigning attributes, such as, price, type, supplier, date of delivery, type of merchandise etc to an RFID security tag in accordance with the present invention are described. First, step 100, the reader scans for a solar powered RFID security tag in close vicinity with the reader. Second, step 102, the reader authenticates the RFID security tag by checking the identification code of the RFID security tag with a list of pre-issued identification codes of the tags.

Third, step 104, the reader communicates with the system 110 to check the attributes assigned to the tag by the system. If the attributes are already assigned to the tag then the attributes are cross checked with the data associated with the system (104A) and control goes back to the first step 100. If the tag has no attributes assigned then the control goes to a next step 106. In a next step 106, a predefined price is assigned to the RFID security tag. In a next step 108, a predefined merchandise is associated with the RFID security tag and the database is also updated accordingly.

Figure 12:
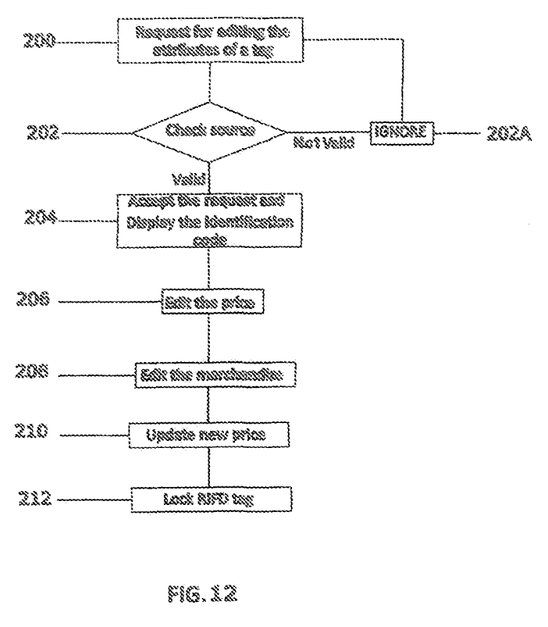
FIG. 12 is flow chart that shows steps involved in a process for RFID security tags in accordance with the present invention.

Referring to FIG. 12, steps involved in a process of controlling the attributes of RFID security tag in accordance with the present invention is described. In a first step 200, the system 110 receives a request to edit the attributes associated with a RFID security tag. In a second step 202, validity of the request is checked. In this step 202, the source of the request is checked. If the source is an authorized source then the request is honored. If the request is not valid then the request is ignored (202A). In a next step 204, the valid request is accepted and the unique ID in the tag is displayed. In a next step 206, a request to change the price is accepted. In a next step 208, the merchandise associated with the RFID security tag is displayed for confirmation. In a next step 210, the new price is reconfirmed to update the new price. Then, in 212, the RFID security tag is locked.

In operation, the system 110 of the present invention includes a plurality of RFID tags which may be solar powered 116, and the identification number of each of the tags 116 is entered in the database 126 of the merchandise system 110. Each of the RFID security tags 116 is associated with required merchandise attributes such as the type of merchandise, source, date of arrival, price, discount, inventory identification number etc. Initially there is no attribute associated with the security tag 116. System 110 assigns required data as per the requirement.

The solar powered RFID security tags 116 of the present invention communicate with the system 110 through preferably the readers 114. The system 110 includes a plurality of such readers 114. The readers 114 are connected to the server 124 either through an intranet or through the internet. One reader 114 may exchange data with more than one tag 116. The attributes such as price assigned to a tag 116 and thereby to merchandise is advantageously remotely changed through the system 110. However, only authorized requests to the system 110 are honored. Any unauthorized request to change the attributes associated with a tag 110 is ignored by the system 110. An unauthorized user request may come from an unauthorized reader. These unauthorized readers may unlawfully allow a shop lifter to gain access to the circuitry of the RFID tag and change certain attributes, e.g., shutting off the security feature or changing the price on a tag. The above system compensates for this by verifying the RFID security tag by checking the identification code of the RFID security tag with a list of pre-issued identification codes of the tags and verifying that the reader asking for this request is part of the system and has system controller access rights.

A preferred process of changing price of the RFID security tag 110 in accordance with the present invention is described. A reader 114 is brought in close proximity with desired merchandise to identify the security tag 114 associated with that Merchandise. Reader 114 then scans and provides the data of the security tag 116 to controller 112 for authorization. On authorization, the reader 114 allows the authorized user to access the information and displays the attributes such as price, make etc. associated with the merchandise. The reader device 114 now allows the user to access the edit mode of the controller 112. Then the user changes the price of the merchandise associated with the security tag using the reader 114.

A user, preferably, an administrator of the controller has right to remotely change the price displayed on the security tag associated with the merchandise. The controller 112 sends signals to all of the readers to identify a security tag having a predefined identification code. All readers 114 send signal in their proximity to find and identify the requested security tag. The reader that is able to gather and identify the requested tag sends the signals along with the requested data back to the controller. The user changes the price of the merchandise by changing the price associated with the tag 116.

Readers 114 are positioned at various exit doors and other locations. Reader scans the merchandise being taken out from the store. The controller 112 rings a theft alarm if any merchandise is taken out from the store without making the payment. Readers 114 are placed at various locations in the store such as windows, ventilators to avoid any theft from the store.

The merchandise is arranged in the stores at various locations. Each item of the merchandise is assigned to one tag. When a customer brings any item on the payment counter, a reader on the counter identifies the tag, and the merchandise associated with the tag. The attributes of the tag, such as the price, item type and item number associated with the tag that is fed to the billing system.

The solar powered tags use the solar energy to power of the circuit and memory of the tag. The use of solar power is aimed at avoiding any chance of malfunctioning due to unavailability of power in the RFID tag. A more secure tag leads to more accurate inventory management and decreases the chance of theft.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed:

1. A security tag comprising;
   a security sensor, the security sensor sending and receiving wireless signals;
   an electronic circuit, the electronic circuit coordinating the wireless signals, the wireless signals being associated with merchandise data;
   a display, the display showing at least one attribute of the merchandise data; and
   a locking pin and a clutch assembly capable of affixing the security tag to a merchandise item, an insertion of the locking pin into the clutch mechanism causes a transmission of a wireless signal indicating a closed status for the security tag, and a release of the locking pin from the clutch assembly causes a transmission of a wireless si al indicating an open status for the security tag.

2. The security tag of claim 1 wherein the electronic circuit includes a processor and memory.

3. The security tag of claim 2 wherein the electronic circuit stores an identification code of the security tag in the memory.

4. The security tag of claim 3 wherein the electronic circuit stores, displays, and edits the merchandise data associated with the security tag.

5. The security tag of claim 1 further comprising:
   a power storage unit.

6. The security tag of claim 5 wherein the power storage unit is connected to a solar panel that provides energy to the electronic circuit.

7. The security tag of claim 1 wherein the electronic circuit is an RFID circuit.

8. The security tag of claim 7 wherein the RFID circuit communicates with external devices.

9. The security tag of claim 8 wherein the external devices are at least one of a controlling unit and an RFID reader.

10. The security tag of claim 9 wherein the RED reader reads the security sensor through radio frequency signals.

11. The security tag of claim 1 wherein the merchandise data includes a price of an item and the display shows the price of the item.

12. A system for controlling and displaying prices of merchandise on security tags comprising:
    a system controller for controlling attributes associated with merchandise;
    a plurality of security tags, the security tag including a display adapted to show at least one attribute associated with the merchandise, the plurality of security tags each including a locking pin and a clutch assembly capable of affixing the security tags to merchandise items, an insertion of the locking pin into the clutch mechanism causes a transmission of a wireless signal indicating a closed status for the security tag, and a release of the locking pin from the clutch assembly causes a transmission of a wireless signal indicating an open status for the security tag; and
    a plurality of readers fix reading and remotely changing the attributes associated with merchandise.

13. The system of claim 12 wherein the controller includes a RAM, a coder, a decoder, a database and a radio frequency signal receiver.

14. The system of claim 13 wherein each of the security tags includes sensor, electronic circuit, a RAM, a ROM, and power storage.

15. The system of claim 12 wherein, the at least one attribute associated with the merchandise is a price displayed on the tag and is changeable from the controller by an authorized user.

16. The system of claim 15 wherein the security tag is a programmable RFID device.

17. The system of claim 16 wherein unauthenticated requests to access the database of the controller are ignored.

18. A computer-implemented method for coordinating Radio Frequency Identification (RFID) tags with a management system, the method comprising the steps of:
    scanning for an RFID tag with a particular identification number, the RFID tag including a locking pin and a clutch assembly capable of being affixed to a merchandise item,
    wherein an insertion of the locking pin into the clutch mechanism causes a transmission of a wireless signal indicating a closed status for the security tag, and a release of the locking pin from the clutch assembly causes a transmission of a wireless signal indicating an open status for the security tag;
    transmitting attributes to the RFID tag;
    storing the attributes within a memory associated with the RFID tag; and
    displaying at least one attribute on a display of the RFID tag.

19. The computer-implemented method of claim 18 wherein the management system creates a unique identification number for each RFID tag.

20. The computer-implemented method of claim 18 further comprising the step of:
    activating a security feature of the RFID tag.

21. The computer-implemented method of claim 18 wherein the at least one attribute attribute is edited as needed.

22. The computer-implemented method of claim 18 wherein the attributes includes at least one of a type of merchandise, price, a supplier name, a date of delivery and a product name.

23. The computer-implemented method of claim 18 wherein the RFID tag has a solar power source.

24. The computer-implemented method of claim 18 wherein the RFID tag is used to track sales and inventory.

25. A system for coordinating RFID tags with a management system, comprising:
- one or more processors; one or more computer-readable storage mediums containing instructions configured to case the one or more processors to perform operations including:
    - scanning for an RFID tag with a particular identification number, the RFID tag including a locking pin and a clutch assembly capable of being affixed to a merchandise item, wherein an insertion of the locking pin the clutch mechanism causes a transmission of a wireless signal indicating a closed status for the security tag, and a release of the locking pin from the clutch assembly causes a transmission of a wireless signal indicating an open status for the security tag;
    - transmitting attributes to the RED tag;
    - storing the attributes within a memory associated with the UM tag; and
    - displaying at least one attribute on a display of the security RFID tag.

26. The system of claim 25 wherein the management system creates a unique identification number for each RFID tag.

27. The system of claim 25 farther comprising the step of: activating a security feature of the RFID tag.

28. The system of claim 25 wherein the at least one attribute is edited as needed.

29. The system of claim 25 wherein the attributes includes at least one of a type of merchandise, price, a supplier name, a date of delivery and a product lame.

30. The system of claim 25 wherein the RFID tag has a solar power source.

31. The system of claim 25 wherein the RFID tag is used to track sales and inventory.

* * * * *